(No Model.)
R. R. SPEDDEN.
BRACE FOR AXLE SPINDLES.
No. 274,230. Patented Mar. 20, 1883.
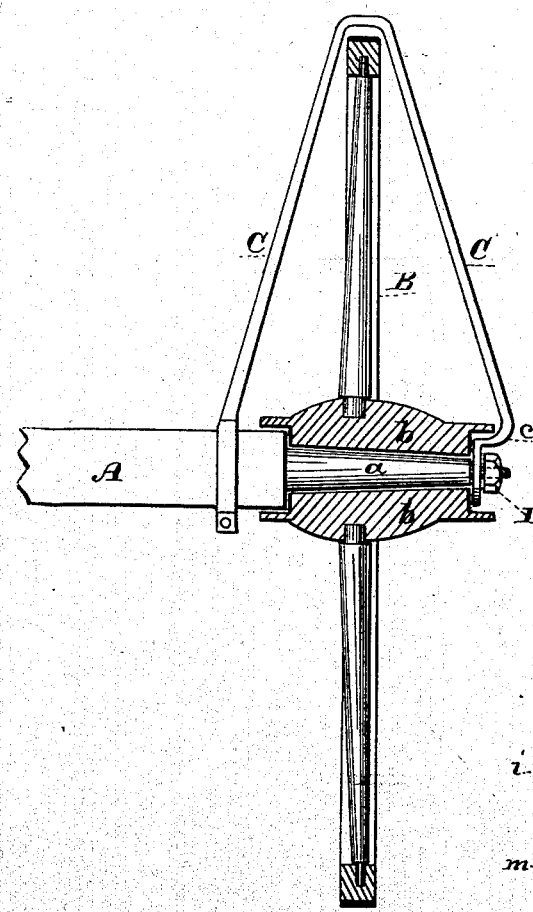
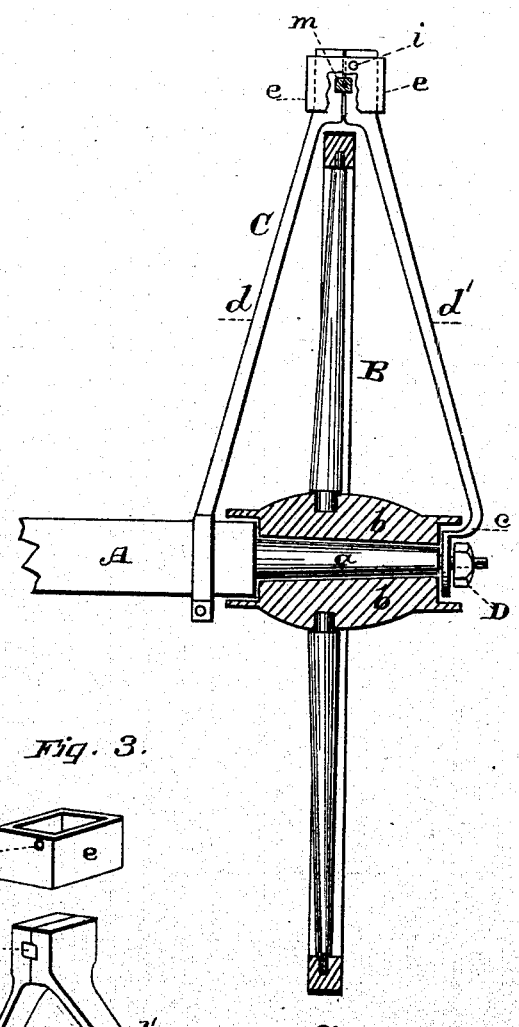
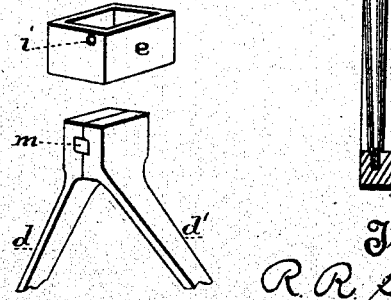
Witnesses,
Geo. H. Strong.
Inventor,
R. R. Spedden
Dewey & Co.
Attorney

UNITED STATES PATENT OFFICE.

ROBERT R. SPEDDEN, OF ASTORIA, OREGON.

BRACE FOR AXLE-SPINDLES.

SPECIFICATION forming part of Letters Patent No. 274,230, dated March 20, 1883.

Application filed January 2, 1883. (No model.)

*To all whom it may concern:*

Be it known that I, ROBERT R. SPEDDEN, of Astoria, of Clatsop county, State of Oregon, have invented an Improved Brace for Axle-Spindles; and I hereby declare the following to be a full, clear, and exact description thereof.

My invention relates to a new and useful brace for strengthening the spindles of axles of wheeled vehicles; and it consists in the details of construction of a rod or bar attached by one end to the axle and by the other to the end of the spindle, its intermediate portion passing around or over the rim of the wheel.

The object of my invention is to strengthen the spindle without increasing the friction, whereby a smaller spindle may be used, which will have as much strength as and less friction than a larger one without a brace, as will hereinafter fully appear, reference being made to the accompanying drawings.

Figure 1 is a section of a wheel, showing the application of my invention. Fig. 2 is a modification of the same, showing brace in two parts. Fig. 3 are details showing fastening for two parts.

Let A represent a portion of an axle having a spindle, $a$, upon which is mounted the hub $b$ of the wheel B in the usual manner. Now, it is obvious that if I wish to gain strength in the spindle by increasing its diameter I will also produce undue friction, which must be avoided; and if I lessen the friction by reducing the diameter of the spindle I lose in strength. To obviate this difficulty and reduce the friction without losing in strength I have the brace C. This consists of a strong iron or steel bar, the inner end of which is suitably clipped, bolted, or otherwise attached firmly to the axle. It thence passes to the rim of the wheel, over it, though without touching it, and thence to the outer end of the spindle $a$. Its end is provided with an eye, and is so bent at $c$ that this eye shall fit over the end of the spindle within the hub $b$, and be secured in place by the common nut D, which secures the wheel on its journal.

This bar or brace, while it can be made in a single piece, is preferably constructed in two pieces, in order to provide for its ready removal when, for any cause, it becomes necessary to take off the wheel. This construction is shown clearly in Fig. 2, in which the two parts are designated by the letters $d\ d'$. These have flat meeting faces at their tops, and each is recessed or notched to receive a square key, $m$. The two are held together by a cap or band, $e$, which binds them, and is itself secured by a pin or bolt, $i$, as shown. The key $m$ and the band $e$ together hold the parts $d\ d'$ firmly. When this bolt $i$ is removed the band may be taken off and the two pieces $d\ d'$ separated, the former being removable from the end of the spindle when the nut D is unscrewed. The effect of this rod as a brace is plain.

The spindle can be strengthened to any desirable extent, and therefore I can make the spindles small enough to materially reduce the friction, and yet have them sufficiently strong. The spindle cannot be bent or broken without bending or breaking the brace.

When this brace is attached to the axle inside the hub it must be adapted, as by clips, to be detached when desired.

Having thus described my invention, what I claim as new, and desire to secure by Letters Patent, is—

1. The axle A and spindle $a$, wheel B, and hub $b$, in combination with the brace C, consisting of bars $d\ d'$, the ends of which are secured to the axle and to the end of the spindle, and a means for binding said bars together at the wheel-rim, whereby they may be readily separated, substantially as herein described.

2. The axle A and spindle $a$, wheel B, and hub $b$, in combination with the brace C, consisting of bars $d\ d'$, the ends of which are secured to the axle and to the end of the spindle, the key $m$, and the band or cap $e$, fitting over and binding together their other ends at the wheel-rim, substantially as herein described.

In witness whereof I hereunto set my hand.

ROBERT R. SPEDDEN.

Witnesses:
G. F. PARKER,
A. M. TWOMBLY.